(12) United States Patent
Saito et al.

(10) Patent No.: US 7,651,283 B2
(45) Date of Patent: Jan. 26, 2010

(54) OPTICAL DEVICE

(75) Inventors: Yasunori Saito, Honjo (JP); Hitoshi Nozue, Chichibu (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 309 days.

(21) Appl. No.: 11/610,732

(22) Filed: Dec. 14, 2006

(65) Prior Publication Data

US 2007/0154207 A1 Jul. 5, 2007

(30) Foreign Application Priority Data

Dec. 28, 2005 (JP) ............................. 2005-378658

(51) Int. Cl.
*G03B 9/02* (2006.01)

(52) U.S. Cl. .................................... 396/507

(58) Field of Classification Search ......... 396/505–510, 396/359, 545; 399/207, 237; 348/224.1, 348/743, 335, 362, 340, 342, 360; 359/885, 359/888, 889, 593; 353/97
See application file for complete search history.

(56) References Cited

U.S. PATENT DOCUMENTS

| | | | | |
|---|---|---|---|---|
| 1,689,258 A | * | 10/1928 | Seymour | 396/307 |
| 3,013,481 A | * | 12/1961 | Biedermann et al. | 396/455 |
| 3,584,558 A | * | 6/1971 | Easterly | 396/505 |
| 3,675,562 A | * | 7/1972 | Sanada et al. | 396/510 |
| 3,682,075 A | * | 8/1972 | Profitt | 396/545 |
| 4,113,359 A | * | 9/1978 | Koike et al. | 359/230 |
| 5,293,542 A | * | 3/1994 | Ise et al. | 348/363 |
| 5,394,212 A | * | 2/1995 | Morizumi | 396/505 |
| 5,422,697 A |   | 6/1995 | Ichinomiya et al. | 396/510 |
| 5,479,298 A | * | 12/1995 | Yanagi et al. | 359/888 |
| 5,689,746 A | * | 11/1997 | Akada et al. | 396/508 |

FOREIGN PATENT DOCUMENTS

| | | |
|---|---|---|
| JP | 2-190833 | 7/1990 |
| JP | 5-281590 | 10/1993 |
| JP | 2000-036917 | 2/2000 |
| JP | 2002-229095 | 8/2002 |

* cited by examiner

*Primary Examiner*—Melissa J Koval
(74) *Attorney, Agent, or Firm*—Fitzpatrick, Cella, Harper & Scinto

(57) ABSTRACT

This invention prevents a degradation in image quality resulting from undesirable reflected light and undesirable transmitted light generated near the ridgeline of the edge portion of an optical element including an aperture blade or an ND filter. The aperture edge of the aperture blade cooperates with the aperture edge of another aperture blade to form an almost rhombic aperture. A small saw-toothed and non-periodic uneven portions having various sizes are formed along two, front and rear ridgelines of the aperture edge and along those of the ND filter. When incident light beams strike the aperture edge of the aperture blade or the edge of ND filter, the uneven portions formed at the ridgeline reflect them in various directions.

13 Claims, 19 Drawing Sheets

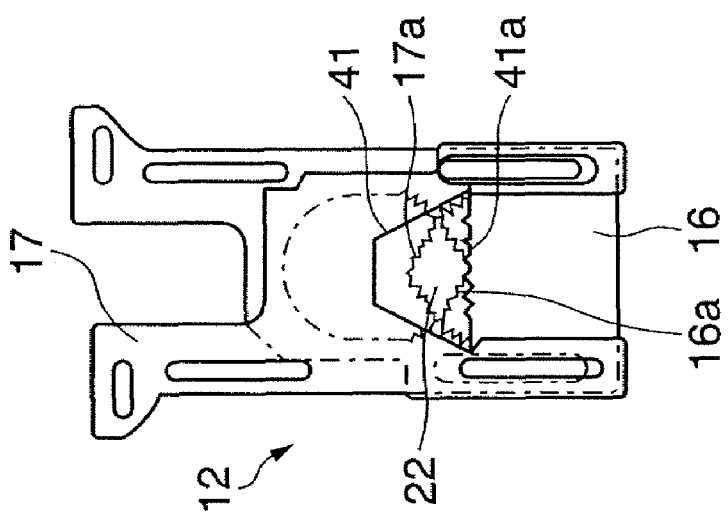
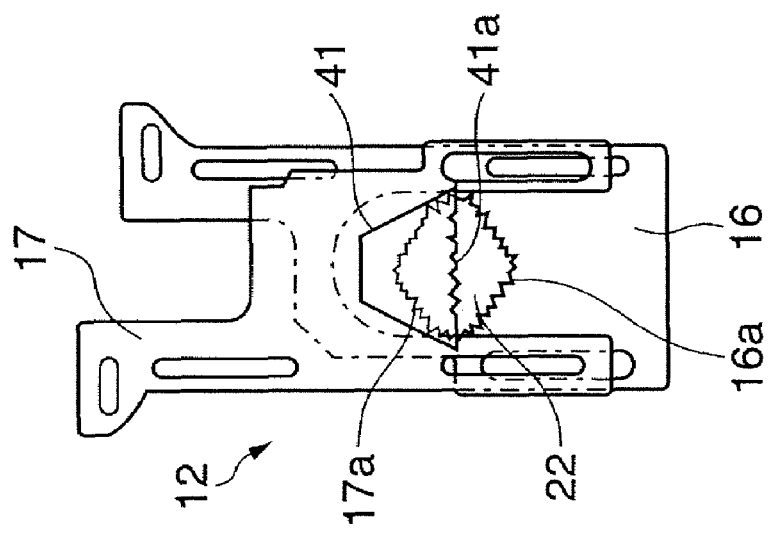
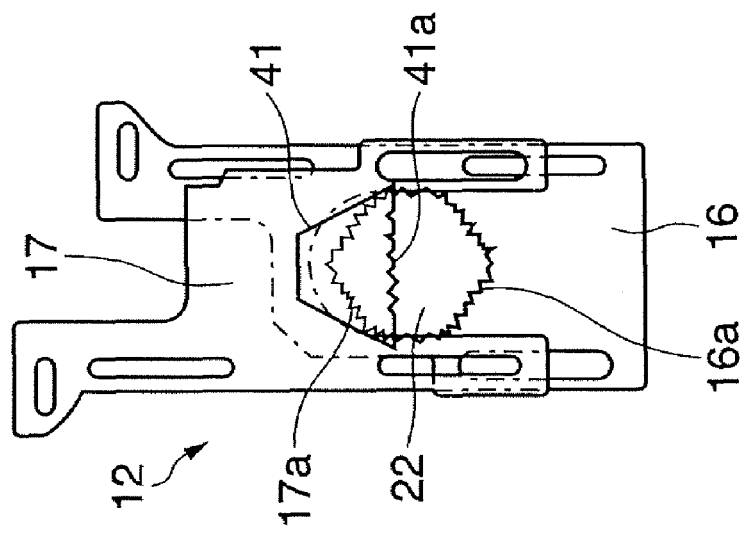

PRIOR ART

PRIOR ART

PRIOR ART

PRIOR ART

OPTICAL DEVICE

BACKGROUND OF THE INVENTION

1. Field of the Invention

The present invention relates to an optical device which is mounted in a photographing optical system such as a optical system of video camera or still camera to particularly prevent ghost or flare in an photographed image.

2. Description of the Related Art

A photographing optical system such as a video camera or still camera uses an aperture device which changes the aperture size by using a plurality of aperture blades to adjust the quantity of light. If the aperture size is excessively small, diffraction of light poses a problem of degradation of the image quality. In view of this, in order to prevent the aperture size from becoming excessively small even when photographing a high-luminance object, an aperture device which employs an ND (Neutral Density) filter together with aperture blades has been proposed.

An aperture edge 1a of an aperture blade 1 which forms an aperture may not receive any machining or processing at all after cutting, as shown in the partially enlarged view of FIG. 16. In this case, when light strikes the aperture edge 1a, reflected light beams are not scattered in random direction. They intensify each other on an image forming surface in a certain direction with respect to the surface of the aperture edge 1a. If this unwanted reflection occurs in spaces among a plurality of photographing lenses, flare or ghost occurs in the image and degradation of the image quality occurs.

In view of this, a black coating is applied to the inner side of a lens barrel or the surfaces of the aperture blades to suppress reflection, or the ND filter is mounted in the barrel to suppress ghost or the like. When photographing a particularly high-luminance object such as the sun or an intense light source, however, a radial ghost may occur around the object image. This is because the light that has struck a portion near the ridgeline of the edge portion of the aperture blade or the end face of the edge portion of the ND filter forms harmful light.

As a prior art, e.g., Japanese Patent Laid-Open No. 5-281590 discloses a known technique in which small steps are formed on the end face of the aperture edge of the aperture blade entirely or partly. The steps scatter the harmful light generated by reflection at the end surface of the aperture blade, to the left and right with respect to the incident direction of light to prevent concentration of the harmful light.

Japanese Patent Laid-Open No. 2002-229095 also discloses a known technique in which a plurality of steps in a stair form on the end face of an aperture blade are irregularly formed. The steps in the stair form scatter the harmful light generated by reflection at the end face of the aperture blade, back and forth with respect to the incident direction of light to prevent concentration of the harmful light.

Japanese Patent Laid-Open No. 2-190833 discloses an aperture device in which an ND filter having plural regions with various uniform transmittances is attached to shade the aperture that the aperture blades form. Plural regions of the ND filter are formed such that their transmittances decrease gradually toward the aperture edge. This prevents degradation in image quality which occurs due to the small aperture size.

The surface of the image sensor or the surface of a cover glass, crystal low-pass filter, an infrared cut filter, or the like may reflect part of the light, which has been transmitted through the ND filter to enter the image sensor, and reflected light may return to the object side. The ND filter surface facing to the image sensor or the ND filter surface facing to the object reflects the return light again. And reflected light forms ghost light that enters the image sensor. To decrease the ghost light, in the aperture device disclosed in Japanese Patent Laid-Open No. 2000-36917, an anti-reflection film is formed on the surface of the ND filter facing to the image sensor.

An ND filter is available which is obtained by a method of mixing and kneading a light absorbing organic dyes or pigments in a plastic material. Also, an ND filter is known which is obtained by forming a light absorbing film on the surface of a plastic substrate in accordance with the evaporation method. The advantage of the former filter resides in that it enables manufacturing of a large amount of filters having a uniform density at a low cost. In the former filter, however, the transmittance changes more than in the latter filter with respect to a wavelength within the wavelength range of visible light, leading to a larger non-uniformity. Therefore, as the ND filter to be used in the aperture device, those manufactured by the evaporation method are preferably employed.

As the plastic substrate of the ND filter manufactured by the evaporation method, a film-like plastic substrate which has a small haze factor representing a haze and has a large light transmittance is employed. More specifically, for example, ND filter is known which is obtained by forming a light absorbing film on a transparent plastic substrate made of polyethylene terephthalate, polycarbonate, acrylate, cycloolefin, polymethylpentene, or the like.

If the plastic substrate has a large haze factor, the image quality is degraded because of scattering of light. A plastic substrate is preferably employed to manufacture a ND filter because it is lightweight and can be cut readily. The ND filter employing the plastic substrate has a thickness of 50 µm to 300 µm, and preferably 100 µm.

The substrate of the ND filter is a plastic substrate. As shown in FIG. 17, if an edge portion 2a of an ND filter 2 does not receive particular machining or processing, the edge portion 2a reflects some part of light that has hit a end face or a portion near the ridgeline of the edge portion 2a. And the other part (not shown) of the light is transmitted through the edge portion 2a. Thus, the reflected or transmitted light does not form scattered light that diffuse in random directions, but tends to form ghost light which is uniformly reflected by the edge portion 2a or ghost light which has uniformly transmitted through the edge portion 2a. As a result, on the image forming surface, ghost occurs in the vertical direction with respect to the edge portion of the ND filter. The lower the density of the ND filter is, the more remarkable the ghost becomes.

With the solution disclosed in Japanese Patent Laid-Open No. 5-281590 of forming uneven portions on the end face of the aperture blade, the uneven portions merely distribute the ghost light to the left and right with respect to the propagating direction. Thus, the ghost or the like does decrease but not sufficiently.

With the solution of forming a stair form portion on the end face of the aperture blade from the entering side of aperture to the exit side of it, as in Japanese Patent Laid-Open No. 2002-229095, the portion near the exit side ridgeline of the edge portion of the aperture blade is the same as in the prior art. Thus, reflection at this portion generates ghost light or the like.

Even when forming such a stair form portion on the ND filter, light does exist which is transmitted through the plastic substrate and travels toward the exit side, as shown in FIG. 18. Thus, formation of the stair form portion does not solve the problem.

Each of FIGS. 19A to 19C shows the shape of an edge portion 6a of a conventional ND filter 6 which is inserted to shade an aperture formed by aperture blades and to adjust the quantity of entering light. The ridgeline of the edge portion 6a is formed with an angle to suppress ghost light or the like. However, when the object has a high illuminance, mere forming the ridgeline portion having an angle cannot sufficiently eliminate ghost or flare. Hence, reflected light at the end face and transmitted light entering from the end face are not negligible.

SUMMARY OF THE INVENTION

It is an object of the present invention to provide an optical device in which the problems described above are solved and which can prevent a degradation in image quality caused by reflected light or transmitted light at the edge portion of an optical element which forms an aperture of a photographing optical system or is located in the aperture.

In order to achieve the above object, according to the first aspect of the present invention, there is provided an optical device obtained by arranging an optical element in a photographing optical system which forms an object image on an image sensor, wherein at least one optical element includes an edge portion that forms an aperture or an edge portion that is positioned in the aperture, and non-periodic uneven portions are formed at least along a ridgeline of the edge portion.

Further features of the present invention will become apparent from the following description of exemplary embodiments (with reference to the attached drawings).

BRIEF DESCRIPTION OF THE DRAWINGS

FIGS. 12A to 12C are views showing states wherein aperture blades move with respect to a pupil diameter;

DESCRIPTION OF THE EMBODIMENTS

The present invention will be descried in detail with reference to the embodiments shown in FIGS. 1 to 15.

First Embodiment

Figure 1:
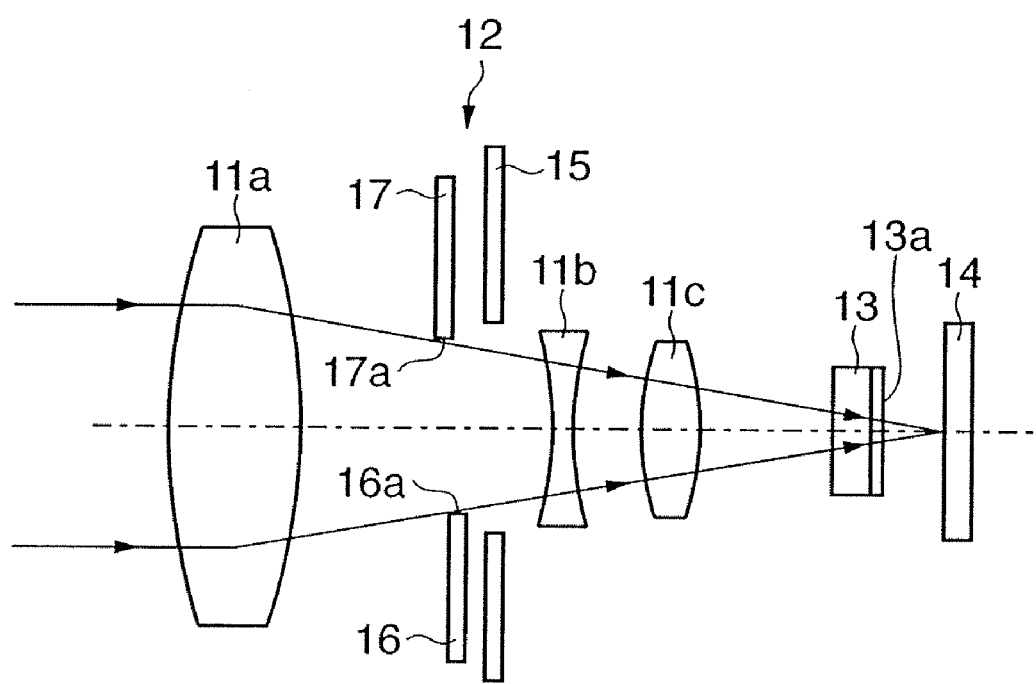
FIG. 1 is a view showing the arrangement of a photographing apparatus.

FIG. 1 is a view showing the arrangement of a photographing apparatus. A lens 11a, an aperture device 12, lenses 11b and 11c, a low-pass filter 13 having an AR coat 13a, and a solid-state image sensor 14 are sequentially lined up on a photographing optical path. In the aperture device 12, two aperture blades 16 and 17 which are made of a plastic material and have widths of 50 μm to 125 μm are movably attached to a support plate 15 such that their edge portions oppose each other as a pair.

Figure 2:
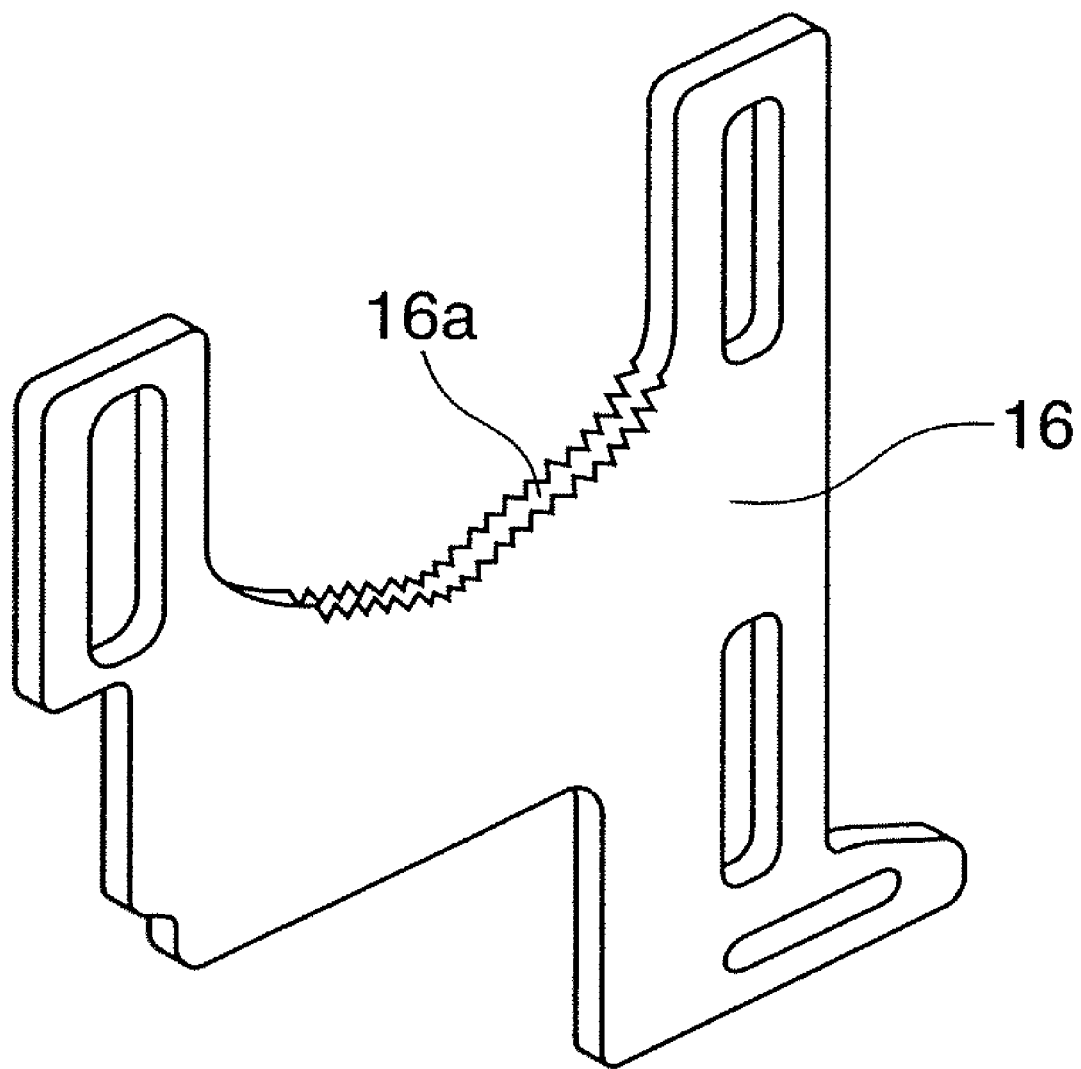
FIG. 2 is a perspective view of an aperture blade according to the first embodiment.
Figure 3:
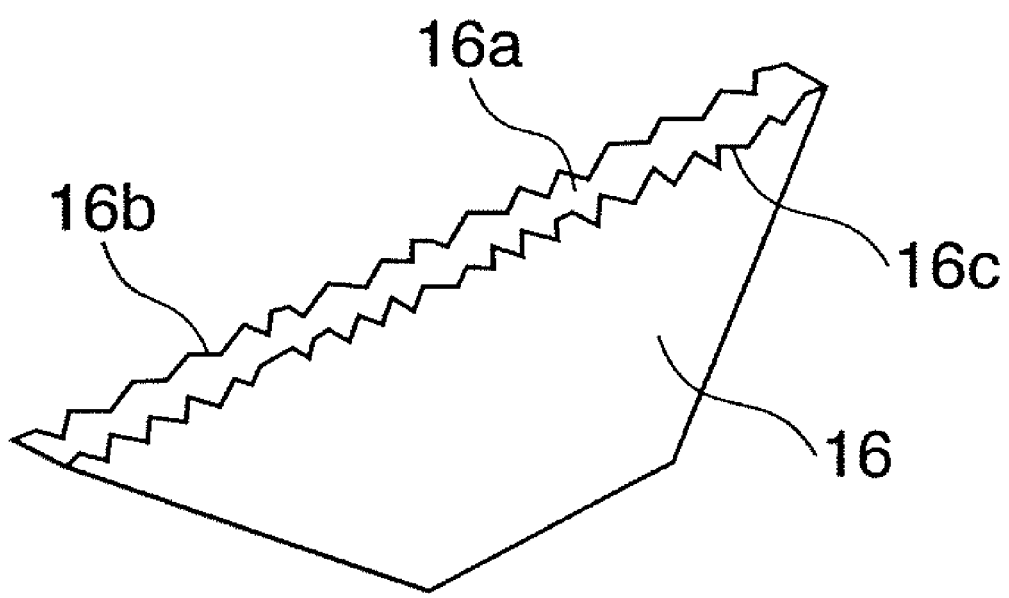
FIG. 3 is a partial enlarged perspective view of the aperture blade.

FIG. 2 is a perspective view of the aperture blade 16 according to the first embodiment. An aperture edge 16a of the aperture blade 16 cooperates with the aperture edge of the aperture blade 17 to form an almost rhombic aperture on the photographing optical path. FIG. 3 is an enlarged perspective view of the aperture edge 16a. Small saw-toothed portions are non-periodical uneven portions having various sizes along front and rear ridgelines 16b and 16c of the aperture edge 16a. The irregular uneven portions are saw-toothed portions having heights ranging from about 0.5 μm to 10 μm. Similar saw-toothed portions are formed also at the ridgelines of an aperture edge 17a, which forms a pair with the aperture edge 16a, of the aperture blade 17.

Figure 4:
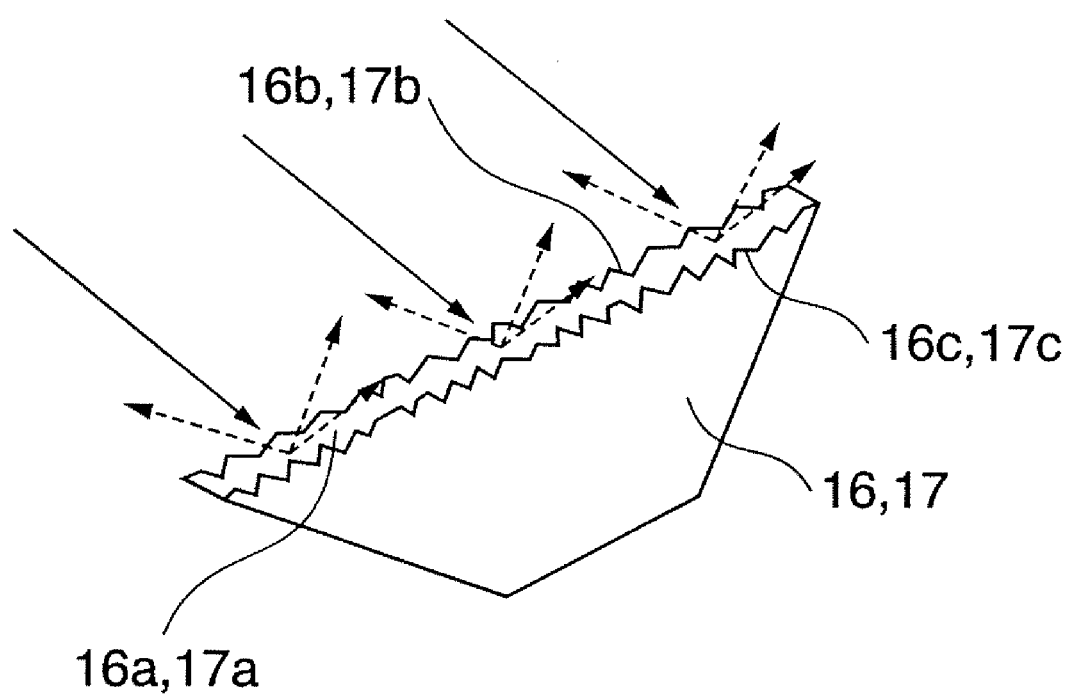
FIG. 4 is a view for explaining the operation of the aperture blade.

Employing the aperture blade 16 or 17 having the above structure, when an incident light beam strikes the aperture edge 16a or 17a, the uneven portions formed at the ridgelines 16b, 16c and the uneven portions formed at the ridgelines 17b, 17c reflect the light in various directions, as shown in FIG. 4. Since the reflecting directions of light on the portions near the ridgelines 16b, 16c, 17b, and 17c are irregular, the directivity of the reflected light becomes weak and the ghost light is weakened by light diffusion. The uneven portions of light entering side ridgelines 16b and 17b diffuse the light more than the uneven portions of exit side ridgelines 16c and 17c. Hence, the uneven portions may be formed only at the ridgelines 16b and 17b.

Supposing that the uneven portions have periodic shape, they may concentrate and intensify the reflected light on the image forming surface, thus forming strong ghost. However the uneven portions have non-periodic shape, as in this embodiment, they can decrease concentration of the reflected light.

Regarding the portions of an end face of aperture blade other than those near the ridgeline of the aperture edge 16a or 17a, it may form a rough surface or have irregular uneven grooves as will be described later.

Second Embodiment

Figure 5:
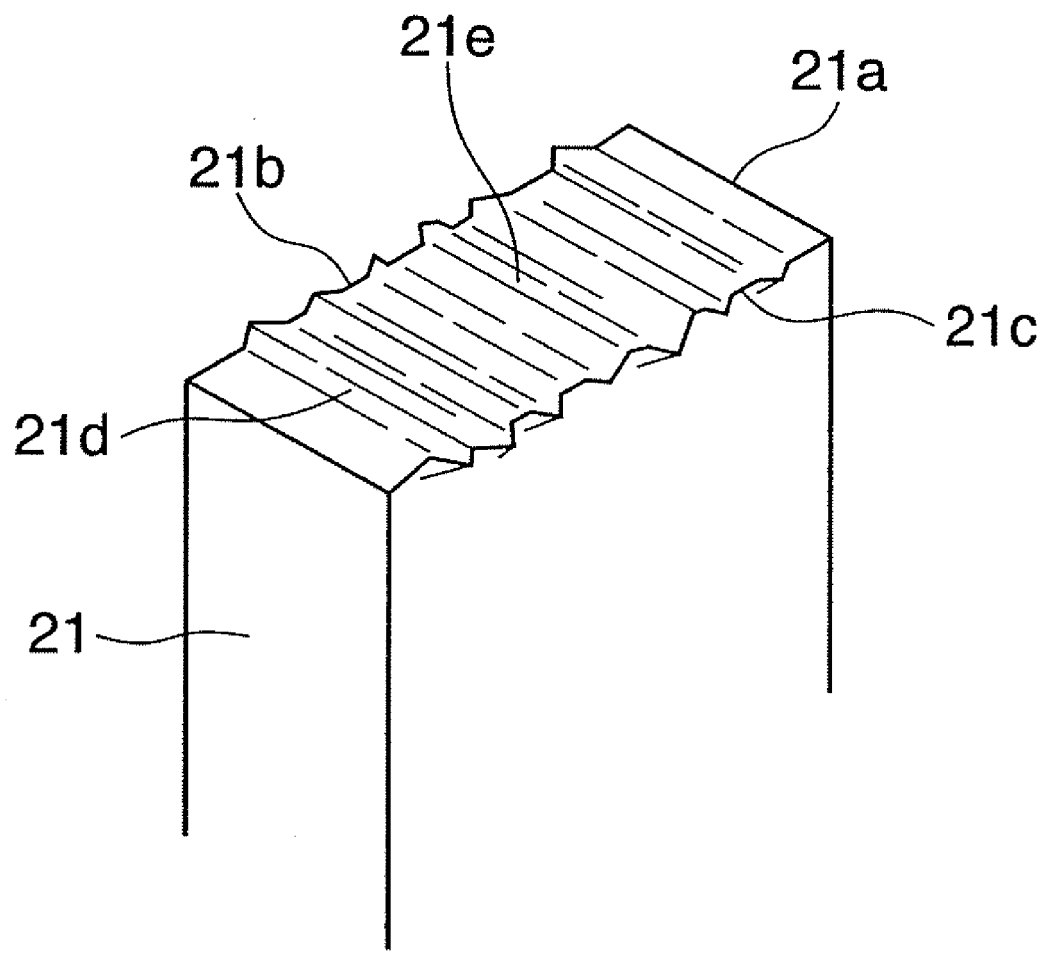
FIG. 5 is a partial enlarged perspective view of an ND filter according to the second embodiment.

FIG. 5 shows an edge portion 21a of an ND filter 21 according to the second embodiment having a predetermined light transmittance. The ND filter 21 can be a film-like ND filter obtained by kneading a pigment or the like in a transparent plastic material, or an ND filter obtained by forming a light absorbing thin film on the surface of a transparent plastic substrate by the evaporation method. In the same manner as in the aperture blades 16 and 17, the ND filter 21 has non-periodic uneven portions along front and rear ridgelines 21*b* and 21*c* of the edge portion 21*a* of the ND filter 21. The irregular uneven portions almost continuously form saw-toothed shapes having various heights ranging from 0.5 μm to 10 μm. Also, the ND filter 21 has uneven grooves 21*e* having various heights in the direction of thickness of an end face 21*d* perpendicular to the ridgelines 21*b* and 21*c*.

Figure 6:
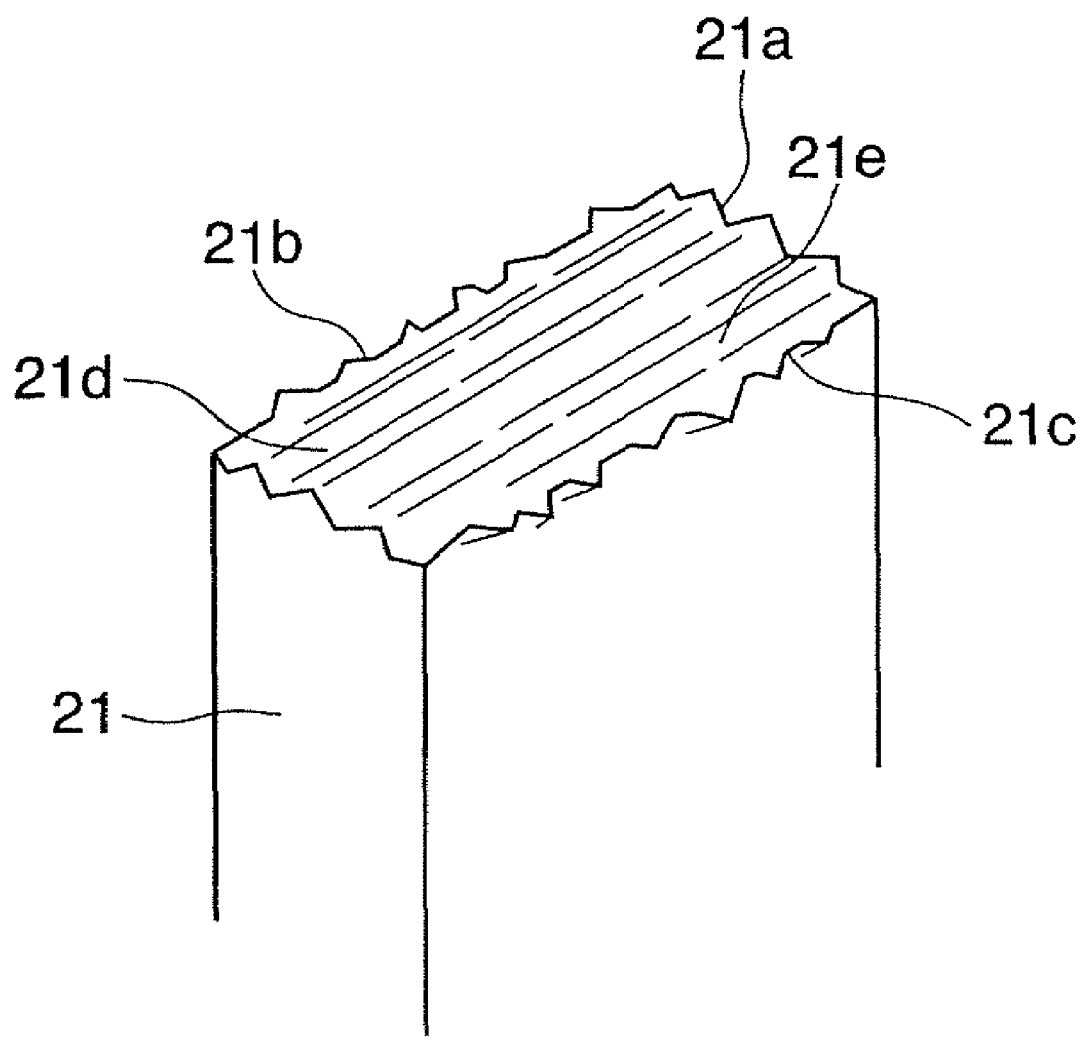
FIG. 6 is a partial enlarged perspective view of another ND filter.

As shown in FIG. 6, the uneven grooves 21*e* can be formed in a direction perpendicular to the direction of thickness of the end face 21*d* of the ND filter 21, that is, in a direction parallel to the ridgelines 21*b* and 21*c*.

Figure 7A:
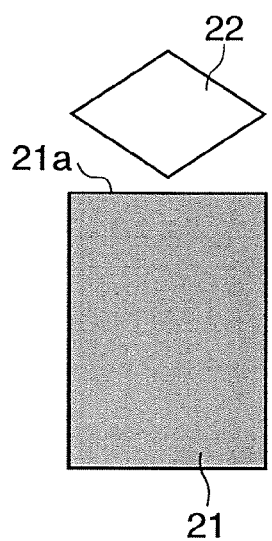
FIGS. 7A to 7C are views for explaining a state wherein the ND filter moves with respect to an aperture.
Figure 7B:
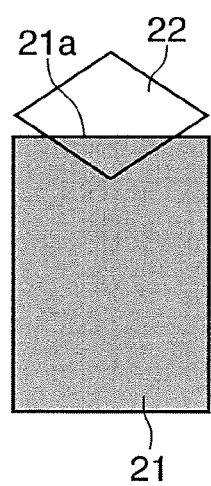
Figure 7C:
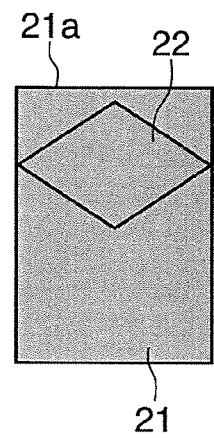

When using the ND filter 21, it is inserted to shade an aperture that two aperture blades 16 and 17 form, to adjust the quantity of light entering the image sensor. FIGS. 7A to 7C are views for explaining a case of moving the ND filter 21 for the purpose of light quantity adjustment. By moving the aperture blades 16 and 17, a rhombic aperture 22 is formed. The ND filter 21 is driven independently of the aperture blades 16 and 17. Even when the area of the aperture 22 is fixed to a constant value, light quantity can be adjusted by moving the ND filter 21.

FIG. 7A shows a state wherein the ND filter 21 has retreated outside the aperture 22. FIG. 7C shows a state wherein the ND filter 21 covers the entire aperture 22. FIG. 7B shows a state wherein the ND filter 21 is positioned to shade some part of the aperture 22, and the edge portion 21*a* of the ND filter 21 appears in the aperture 22.

Figure 8:
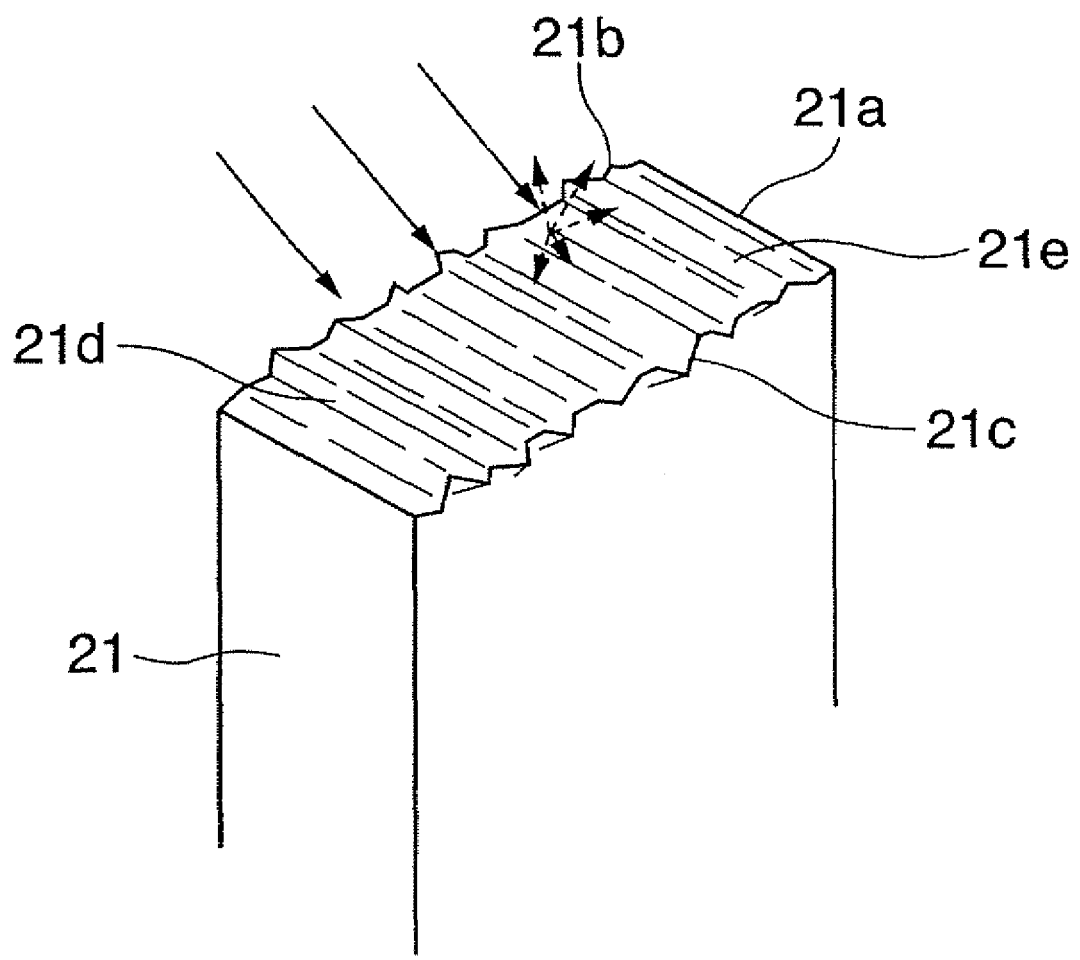
FIG. 8 is a view for explaining the operation of the ND filter.

When operating the ND filter 21 in this manner, the size of the aperture 22 that the aperture blades 16 and 17 form need not become extremely small, thus preventing degradation in image quality due to diffraction caused by small aperture. As shown in FIG. 7B, when inserting the edge portion 21*a* of the ND filter 21 in the aperture 22, light beams strike those portions of the ND filter 21 which are near the ridgelines 21*b* and 21*c*, as shown in FIG. 8. However, the portions near ridgelines 21*b* and 21*c* have small irregular saw-toothed shape, they reflect the light beams in various directions, then the ghost light is decreased.

The ND filter 21 employing substrate made of a plastic material generally has a thickness of 50 μm to 300 μm. When photographing a high-luminance object, mere forming small saw-toothed portions at the ridgelines 21*b* and 21*c* of the ND filter 21 may not be sufficient in eliminating the ghost light or flare light. Namely, the adverse effect caused by light reflected by the end face 21*d* of the ND filter 21 and the adverse effect caused by light entering from and being transmitted through the end face 21*d* cannot be both negligible. Therefore, formation of the saw-toothed grooves 21*e* in the end face 21*d* is effective because they weaken the directivity of the reflected light and transmitted light and they reduce the ghost and flare.

Third Embodiment

Figure 9:
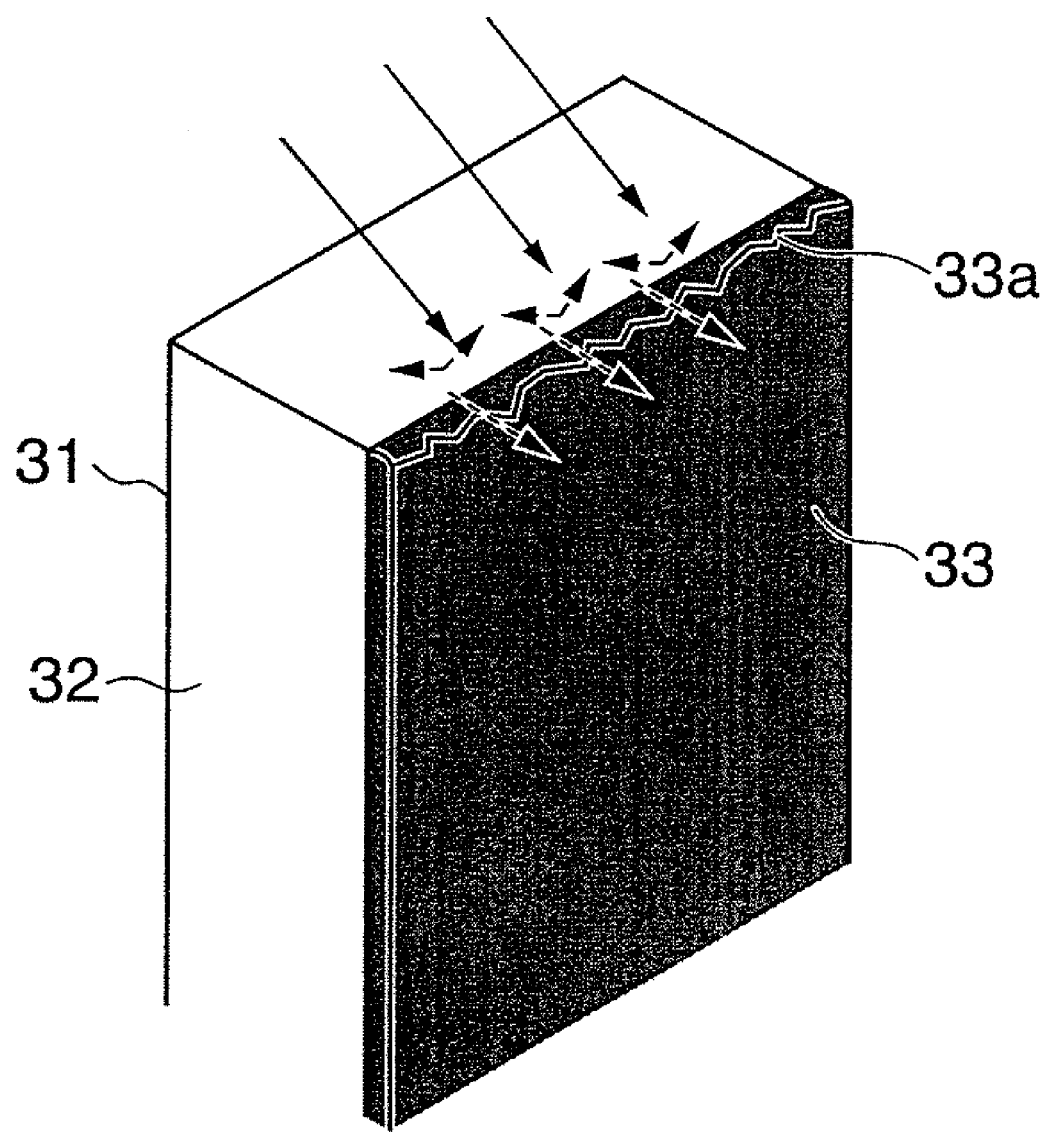
FIG. 9 is a partial enlarged perspective view of an ND filter according to the third embodiment.

FIG. 9 is a perspective view of an ND filter 31 according to the third embodiment. In the ND filter 31 obtained by forming an ND film 33 on the back surface of a transparent plastic substrate 32 by evaporation method. The lower the density of the ND film 33 is, the larger the quantity of light that enters from and is transmitted through the end face become. Thus low density ND filter tend to suffer from ghost and flare.

In view of this, the ND film 33 has uneven portions at the ridgeline 33*a* of its edge portion.

When light beams strike the portion near the ridgeline 33*a* of the ND film 33, the small, irregular saw-toothed portions formed at the ridgeline 33*a* scatter the light beams in various directions. As shown in FIG. 9, if the ND film 33 has a high density, it attenuates the transmitted light, so the light entering from and being transmitted through the end face are also attenuated. Then, the optical system employing high density ND filter does not suffer much from ghost or flare. Therefore, the ridgeline 33*a* of high density ND filter need not have small, irregular saw-toothed portions.

Figure 10:
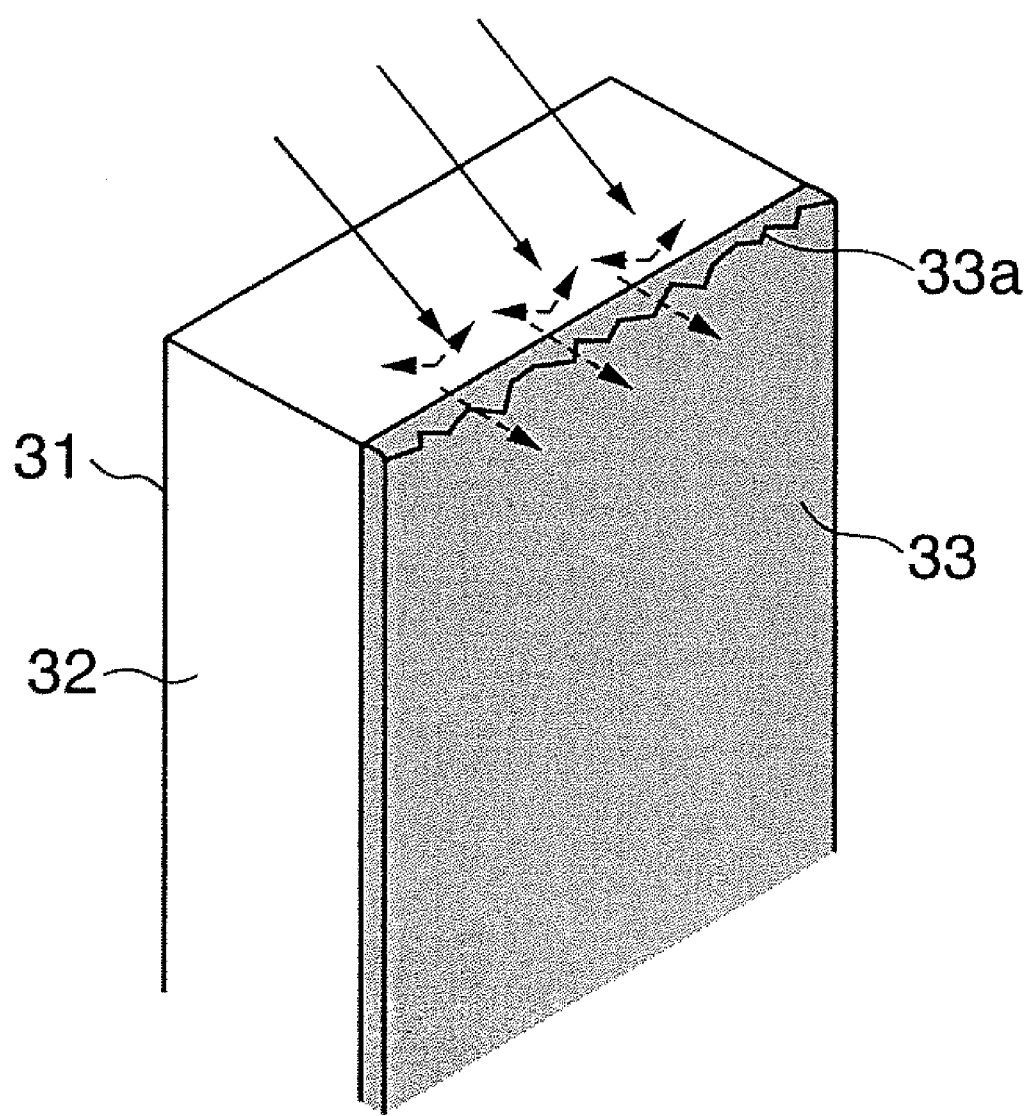
FIG. 10 is a partial enlarged perspective view of a modification of an ND filter.

Ordinarily, however, the density of the ND film 33 is low near the end face, as shown in FIG. 10, and the quantity of light entering from and being transmitted through the end face is large. Therefore, the ridgeline 33*a* must have small, irregular saw-toothed portions.

In this embodiment, the reflecting and transmitting directions of light on the portion near the ridgeline 33*a* of the ND filter 31 are irregular to weaken the directivity of the transmitted light, thus diffusing the light. This can decrease ghost or the like.

Fourth Embodiment

Figure 11:
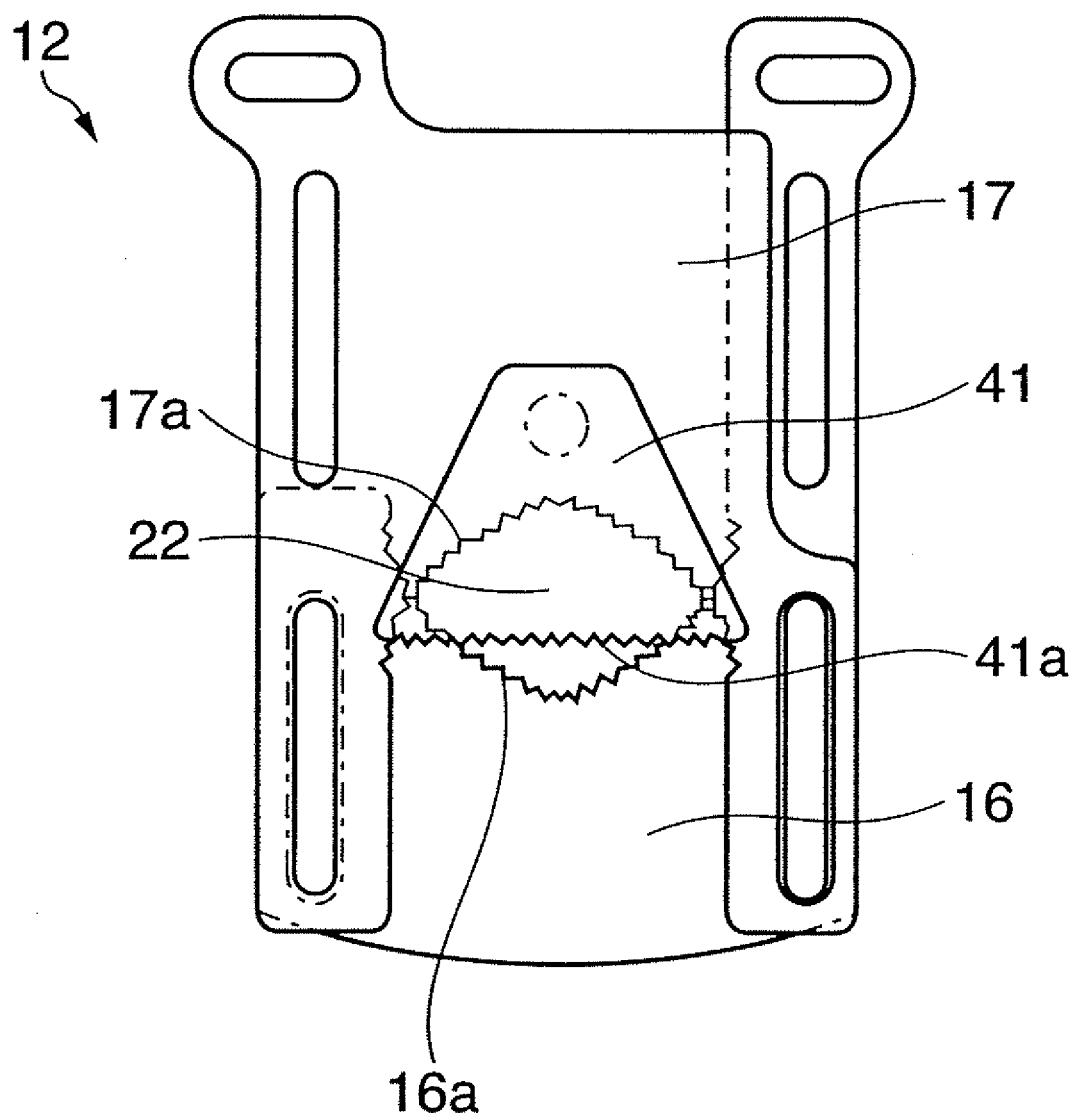
FIG. 11 is a view showing the arrangement of an aperture device according to the fourth embodiment.

FIG. 11 shows an aperture device 12 according to the fourth embodiment. An ND filter 41 moves together with an aperture blade 17. The aperture device 12 adjusts the quantity of light passing through the aperture by driving two opposing aperture blades, i.e., an aperture blade 16 and the aperture blade 17. The almost trapezoidal ND filter 41 having small irregular saw-toothed uneven portions at the ridgeline of an edge portion 41*a* attached to the aperture blade 17. The aperture blades 16 and 17 also have small, irregular uneven portions as described above at their ridgelines.

FIGS. 12A to 12C show states wherein the aperture blade 17 having the ND filter 41 and the aperture blade 16 move for light quantity adjustment. FIG. 12A shows a state wherein the aperture blades 16 and 17 have retreated outside the pupil aperture. FIG. 12C shows a state wherein the ND filter 41 covers the entire aperture 22. FIG. 12B shows an intermediate state between FIGS. 12A and 12C. According to the fourth embodiment, the aperture device 12 that has an operation state in which ND filter 41 shade some part of the pupil aperture or an aperture 22 as shown in FIGS. 12A and 12B can decrease ghost light.

According to the fourth embodiment, the diffusing directions of light which is reflected by or transmitted through a portion near the ridgeline of the ND filter 41 and those of light which is reflected near the ridgelines of the aperture blades 16 and 17 are irregular. Then the directivities of the reflected light and transmitted light are weakened, and ghost or flare is also weakened. The ND filter 41 according to the fourth embodiment is a gradation ND filter in which the farther a light transmitting position is away from the edge portion 41*a*, the higher the filter density at that position becomes continuously. Discontinuous points of density and discontinuous changes of the phase of the transmitted light are eliminated to prevent degradation of the image quality.

Figure 13A:
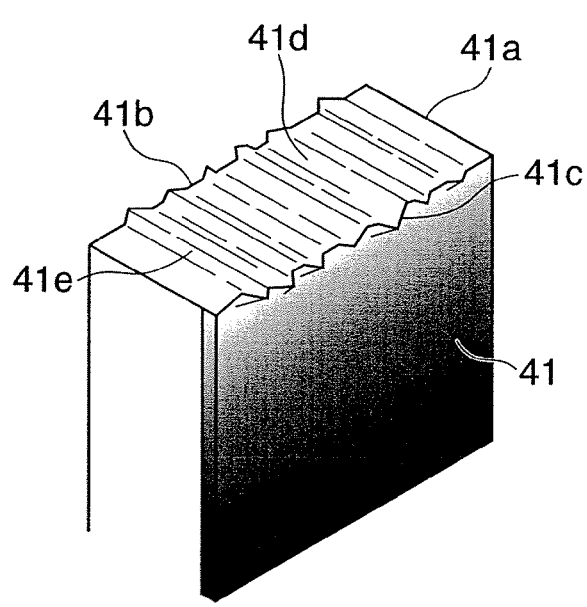
FIGS. 13A and 13B are partial enlarged perspective views of an ND filter according to the fourth embodiment.
Figure 13B:
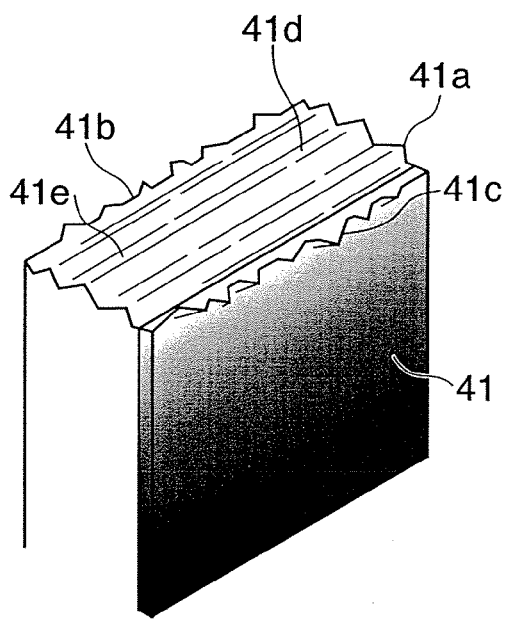

The gradation ND filter 41 is obtained by forming a light absorbing thin film by evaporation method. As shown in FIGS. 13A and 13B, the density of the light absorbing film decreases toward the edge portion 41*a*. The ND filter 41 has small, irregular saw-toothed portions at the ridgelines 41*b* and 41*c* of the edge portion 41*a*, and saw-toothed grooves 41*e* in an end face 41*d* as well. This weakens the directivities of the reflected light and transmitted light generated by the edge portion to eliminate ghost or flare effectively.

In the gradation ND filter, the closer a certain place is to the edge portion, the smaller light attenuation of that place becomes. Accordingly, back surface reflection of light that penetrates the ND filter increases the reflectance of light in addition. Hence, in such gradation ND filter, the edge portion often generates ghost light and flare light. According to this embodiment, in the ND filter 41, the uneven portions are formed at the ridgelines 41b and 41c and the uneven grooves 41e are formed, to eliminate the ghost light and flare light.

Fifth Embodiment

Figure 14:
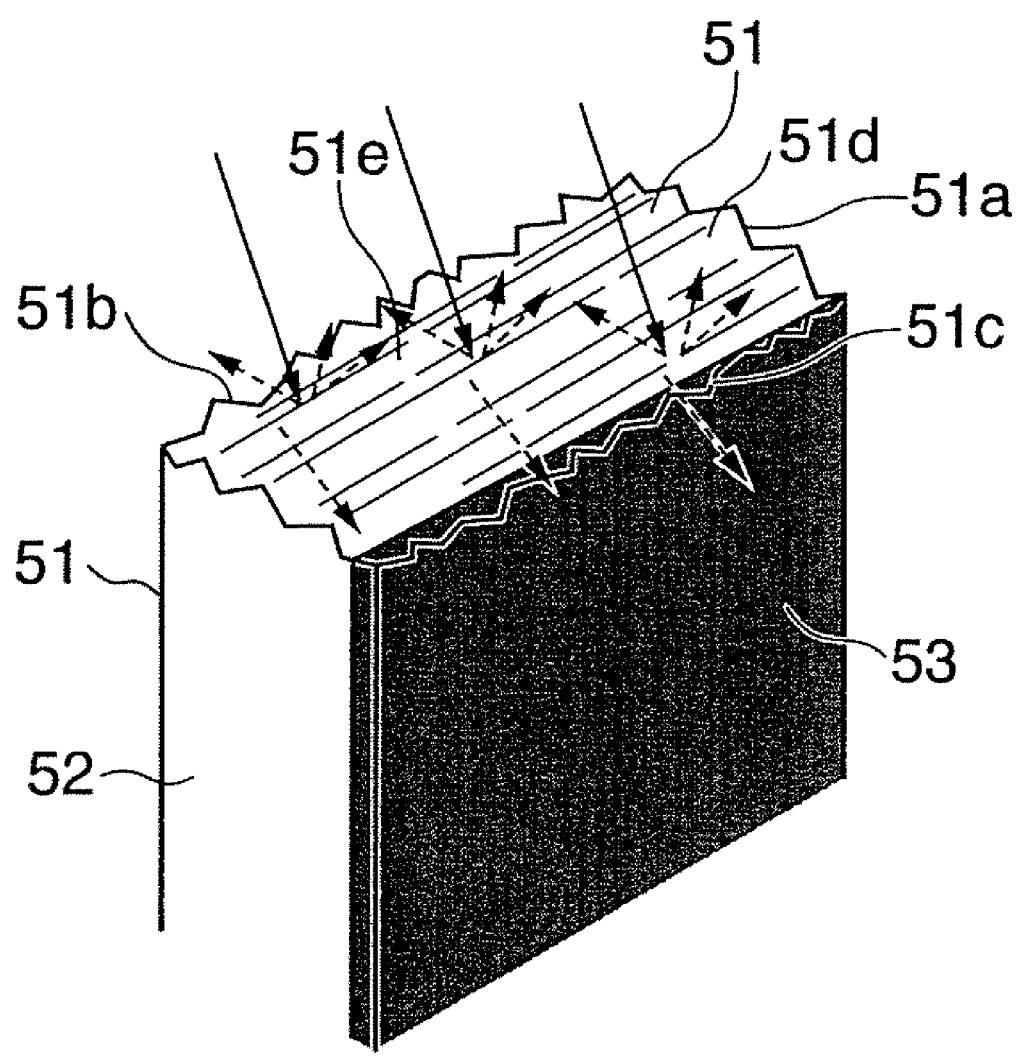
FIG. 14 is a view for explaining the operation of an ND filter according to the fifth embodiment.

FIG. 14 shows an ND filter 51 according to the fifth embodiment, in which an ND film 53 is formed on a plastic substrate 52 by evaporation method. Ridgelines 51b and 51c of an edge portion 51a of the ND filter 51 protrudes from an end face 51d to form protrusions. The protruding ridgelines have non-periodic uneven portions.

The plastic substrate 52 is transparent. Considering the undesirable light which is transmitted through the ND filter 51, the protruding ridgelines 51b and 51c having uneven portions are effective in eliminating ghost light and flare light. Furthermore, the end face 51d of the ND filter 51 that the light beams strike has uneven grooves 51e.

When the portion at the ridgelines 51b and 51c form protrusions and the protrusions have uneven portions in this manner, the light that is reflected at the edge portion or the light that penetrate from the edge portion is more scattered in random directions, and ghost light decreases.

In the respective embodiments of the present invention, the incident light is diffused at the end face of the aperture blade and (or) the end face of the ND filter because of their irregular shape. This weakens the directivities of the transmitted light and reflected light generated by the edge portion so the transmitted light and reflected light are scattered. This can decrease ghost or flare which occurs in the image. Unlike an aperture blade having high light-shielding properties, the ND filter transmits light in some degree. If the ridgeline has a protruding shape, the transmission distance increases. This allows us to expect of a further reduction of ghost light and flare light.

It is preferable that the depths of the uneven portions are smaller than the length of one side of the aperture when the aperture is minimal. Then, with no special structure, the uncertainty of passing light quantity that is arisen by forming the uneven portions in the edge portion of the aperture blade or ND filter, can fall within the range of predetermined allowable error of light quantity.

Figure 15A:
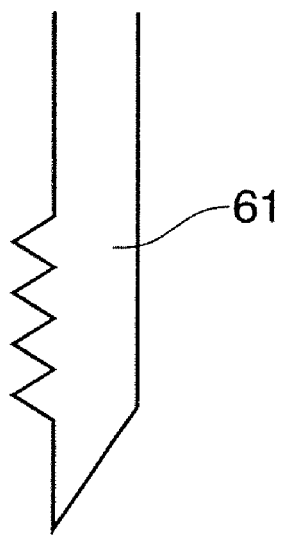
FIGS. 15A and 15B are views showing the arrangement of cutting blades, respectively, for forming uneven portions.
Figure 15B:
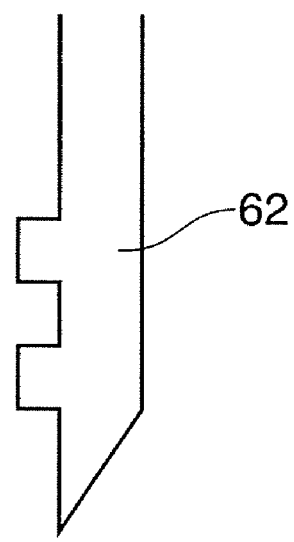
Figure 16:
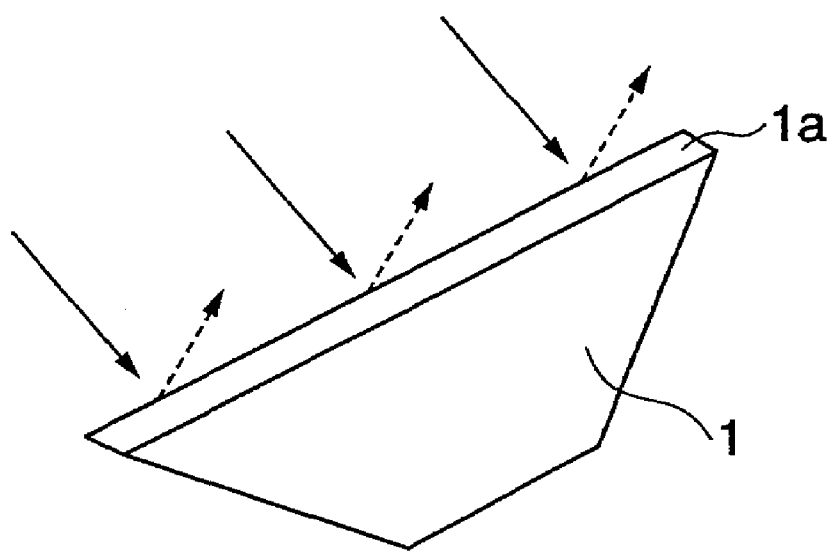
FIG. 16 is a view for explaining the operation of a conventional aperture blade.
Figure 17:
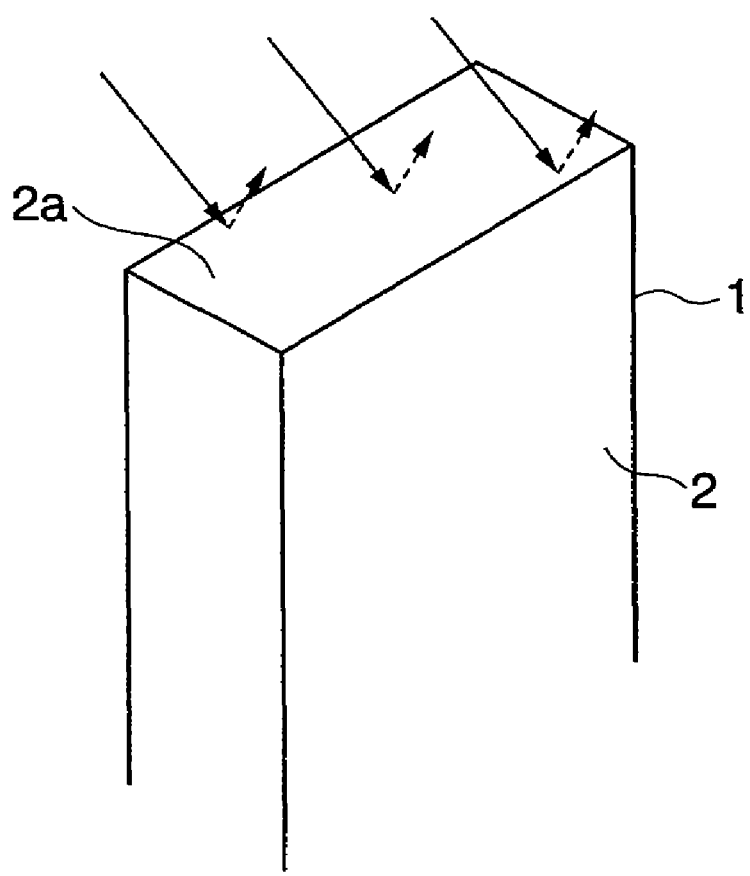
FIG. 17 is a view for explaining the operation of a conventional ND filter.
Figure 18:
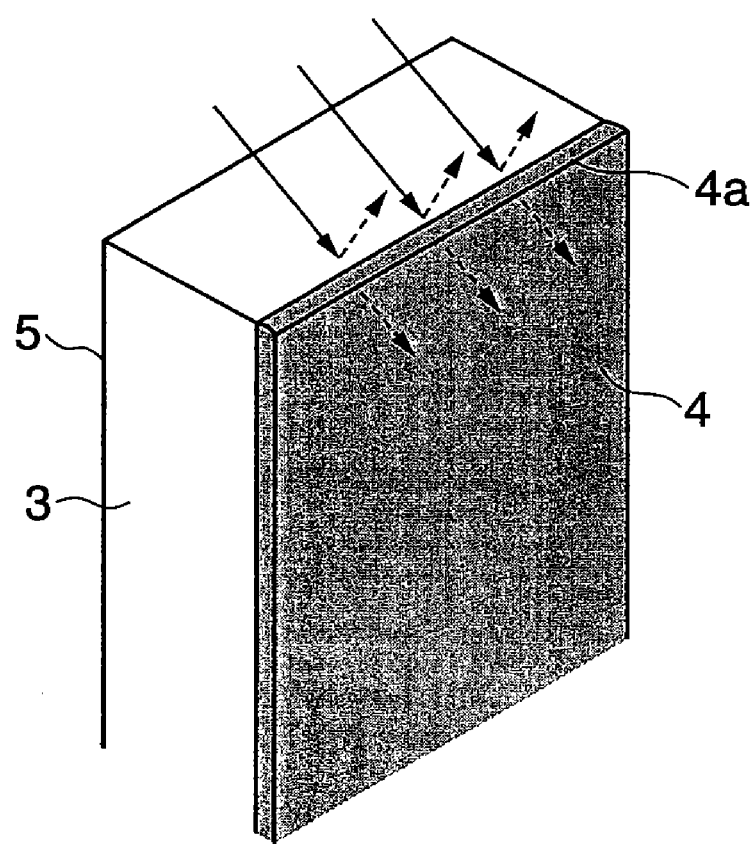
FIG. 18 is a view for explaining the operation of another conventional ND filter.
Figures 19A, 19B, 19C:
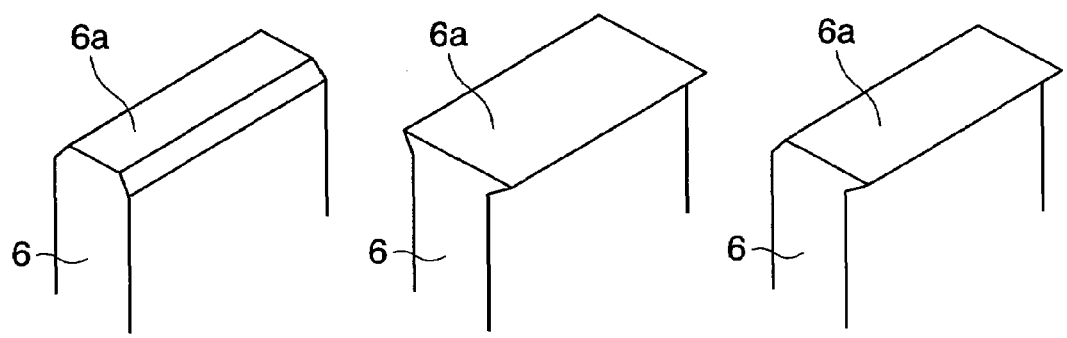
FIGS. 19A to 19C are perspective views of still another conventional ND filters, respectively.

Press cutting or the like can form the uneven portions of the above embodiments. For example, press cutting may be performed using a saw-toothed cutting blade 61 or staircase-like cutting blade 62, as shown in FIGS. 15A and 15B. Uneven portions may be formed with a file after press cutting, or by photolithography if the cost does not matter.

The optical device according to the present invention can decrease ghost light and flare light even when the edge portion of the optical element forms an aperture or is located in an aperture. As a result, no limitation need be imposed on the positioning state of the optical element.

Even when the edge portion of the low-density ND filter is positioned in the aperture, the ND filter can decrease the ghost light and flare light. If the end face of the ND filter also has irregular uneven portions, they can further decrease harmful light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-378658, filed Dec. 28, 2005, which is hereby incorporated by reference herein in its entirety.

What is claimed is:

1. An optical device employed in a photographing optical system which forms an object image on an image sensor, comprising one plate-like optical element or plural plate-like optical elements, wherein at least one optical element includes an edge portion that forms an aperture or an edge portion that is positioned in said aperture, and non-periodic uneven portions are formed along a ridgeline of said edge portion, the uneven portions being formed in a direction of thickness of said plate-like optical element and substantially parallel to an optical axis of the optical device.

2. The optical device according to claim 1, wherein said uneven portions have saw-toothed shape with various sizes.

3. The optical device according to claim 1, wherein an end face of said edge portion of said plate-like optical element has a groove with non-periodic shape, and said groove is directed in a direction different from that of said ridgeline.

4. The optical device according to claim 1, wherein an end face of said edge portion of said plate-like optical element has a groove with non-periodic shape, and said groove is directed in the same direction as that of said ridgeline.

5. The optical device according to claim 3, wherein said non-periodic shape includes saw-toothed shape with various sizes.

6. The optical device according to claim 1, wherein said plate-like optical element comprises a plurality of aperture blades, and said aperture blades operate to form said aperture with said edge portion.

7. The optical device according to claim 1, wherein said plate-like optical element comprises an optical filter, and said edge portion of said optical filter is positioned in said aperture.

8. The optical device according to claim 1, wherein said plate-like optical elements comprise both an optical filter and an aperture blade which forms said aperture with said edge portion, and said edge portion of said optical filter is positioned in said aperture.

9. The optical device according to claim 8, wherein one among said aperture blade and said optical filter is moved independently of the other one of among them.

10. The optical device according to claim 8, wherein said optical filter is moved together with said aperture blade.

11. The optical device according to claim 7, wherein said optical filter comprises an ND filter obtained by forming a light attenuation thin film on at least one surface of a transparent plastic film.

12. The optical device according to claim 7, wherein said optical filter comprises a gradation ND filter in which the farther a light transmitting position is away from said edge portion, the lower a light transmittance at that position of said gradation ND filter becomes continuously.

13. An optical device employed in a photographing optical system which forms an object image on an image sensor, comprising:
one plate-like optical element or plural plate-like optical elements having two generally parallel faces and an edge portion extending between two parallel faces,
wherein said edge portion forms an aperture or is positioned in an aperture, and wherein non-periodic uneven portions, formed along a ridgeline of said edge portion, extend from said edge in a direction generally perpendicular to said parallel faces and generally parallel to an optical axis of the optical device.

* * * * *